US012469942B2

(12) United States Patent
Kim et al.

(10) Patent No.: US 12,469,942 B2
(45) Date of Patent: Nov. 11, 2025

(54) ANTENNA FILTER AND ELECTRONIC DEVICE INCLUDING SAME IN WIRELESS COMMUNICATION SYSTEM

(71) Applicant: SAMSUNG ELECTRONICS CO., LTD., Suwon-si (KR)

(72) Inventors: Jonghwa Kim, Suwon-si (KR); Bonmin Koo, Suwon-si (KR); Dongjoo Kim, Suwon-si (KR); Inho Na, Suwon-si (KR); Danbi Jeon, Suwon-si (KR); Jongwook Zeong, Suwon-si (KR); Sewon Gwon, Suwon-si (KR); Seunghwan Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 18/086,420

(22) Filed: Dec. 21, 2022

(65) Prior Publication Data

US 2023/0121638 A1 Apr. 20, 2023

Related U.S. Application Data

(63) Continuation of application No. PCT/KR2021/007910, filed on Jun. 23, 2021.

(30) Foreign Application Priority Data

Jun. 23, 2020 (KR) ........................ 10-2020-0076792
Mar. 2, 2021 (KR) ........................ 10-2021-0027660

(51) Int. Cl.
*H01Q 21/28* (2006.01)
*H01P 1/207* (2006.01)
(Continued)

(52) U.S. Cl.
CPC ................ *H01P 1/207* (2013.01); *H01P 7/06* (2013.01); *H01P 11/007* (2013.01); *H01Q 21/08* (2013.01)

(58) Field of Classification Search
CPC .......... H01P 1/207; H01P 7/06; H01P 11/007; H01P 1/20336; H01P 1/20309; H01Q 21/08; H01Q 21/0006
See application file for complete search history.

(56) References Cited

U.S. PATENT DOCUMENTS 6,201,456 B1 3/2001 Hiratsuka et al.
7,724,109 B2 5/2010 Knecht et al.
(Continued)

FOREIGN PATENT DOCUMENTS

CN 107317073 A 11/2017
CN 107359394 A 11/2017
(Continued)

OTHER PUBLICATIONS

Office Action issued on May 6, 2024 by the Chinese Patent Office in corresponding CN Patent Application No. 202180045095.
(Continued)

*Primary Examiner* — Dameon E Levi
*Assistant Examiner* — Michael M Bouizza
(74) *Attorney, Agent, or Firm* — Sughrue Mion, PLLC

(57) ABSTRACT

A filter in a wireless communication system includes: a cover; a housing; a printed circuit board (PCB); a resonance plate provided between the cover and the PCB; and a plurality of resonators provided on a single layer in the resonance plate.

16 Claims, 13 Drawing Sheets

(51) Int. Cl.

| | |
|---|---|
| ***H01P 7/06*** | (2006.01) |
| ***H01P 11/00*** | (2006.01) |
| ***H01Q 21/08*** | (2006.01) |

(56) References Cited

U.S. PATENT DOCUMENTS

| | | | | |
|---|---|---|---|---|
| 8,686,614 | B2 | 4/2014 | Kuypers et al. | |
| 10,050,323 | B2 | 8/2018 | Tkadlec et al. | |
| 10,158,340 | B1 | 12/2018 | Wu et al. | |
| 10,476,121 | B2 | 11/2019 | Leray et al. | |
| 11,245,167 | B2 | 2/2022 | Skiebe | |
| 2009/0146763 | A1 | 6/2009 | Hershtig | |
| 2010/0277259 | A1 | 11/2010 | Ahn et al. | |
| 2012/0049649 | A1 | 3/2012 | Fukunaga | |
| 2015/0282179 | A1* | 10/2015 | Seo | H01Q 5/50 370/329 |
| 2017/0263993 | A1* | 9/2017 | Leray | H01P 7/088 |
| 2019/0067771 | A1 | 2/2019 | Skiebe | |
| 2019/0157731 | A1 | 5/2019 | Miyamoto | |
| 2019/0165440 | A1 | 5/2019 | Tamiazzo et al. | |
| 2019/0348735 | A1 | 11/2019 | Wang et al. | |
| 2020/0235484 | A1* | 7/2020 | Kim | H01Q 15/0006 |

FOREIGN PATENT DOCUMENTS

| | | | |
|---|---|---|---|
| CN | 108736116 | A | 11/2018 |
| CN | 109378560 | A | 2/2019 |
| CN | 109428140 | A | 3/2019 |
| CN | 110492208 | A | 11/2019 |
| JP | 2004-147300 | A | 5/2004 |
| JP | 2014-49867 | A | 3/2014 |
| JP | 2014-160947 | A | 9/2014 |
| KR | 1999-0037448 | A | 5/1999 |
| KR | 10-2009-0029363 | A | 3/2009 |
| KR | 10-2009-0032187 | A | 4/2009 |
| KR | 10-2009-0068511 | A | 6/2009 |
| WO | 2018/193318 | A2 | 10/2018 |

OTHER PUBLICATIONS

Communication issued on May 6, 2024 by the Indian Patent Office in corresponding IN Patent Application No. 202317004020.
Communication dated Feb. 16, 2024, issued by the European Patent Office in European Application No. 21829517.8.
Communication issued Oct. 31, 2024 by the China National Intellectual Property Administration in Chinese Patent Application No. 202180045095.7.
Communication dated Nov. 17, 2023, issued by the European Patent Office in European Application No. 21829517.8.
International Search Report dated Oct. 12, 2021, issued by the International Searching Authority in counterpart International Application No. PCT/KR2021/007910 (PCT/ISA/210).
Written Opinion dated Oct. 12, 2021, issued by the International Searching Authority in International Application No. PCT/KR2021/007910 (PCT/ISA/237).
Office Action dated Feb. 21, 2025, issued by Korean Intellectual Property Office in Korean Patent Application No. 10-2021-0027660.
Office Action dated Feb. 28, 2025, issued by China National Intellectual Property Administration in Chinese Patent Application No. 202180045095.7.
Office Action dated May 14, 2025, issued by China National Intellectual Property Administration in Chinese Patent Application No. 202180045095.7.
Communication dated Aug. 13, 2025, issued by Korean Intellectual Property Office in Korean Patent Application No. 10-2021-0027660.
Communication dated Sep. 9, 2025, issued by European Patent Office in European Patent Application No. 21829517.8.

* cited by examiner

ANTENNA FILTER AND ELECTRONIC DEVICE INCLUDING SAME IN WIRELESS COMMUNICATION SYSTEM

CROSS-REFERENCE TO RELATED APPLICATIONS

This application is a bypass continuation of International Application No. PCT/KR2021/007910, filed on Jun. 23, 2021, which claims priority to Korean Patent Application No. 10-2020-0076792, filed on Jun. 23, 2020, and Korean Patent Application No. 10-2021-0027660, filed on Mar. 2, 2021, in the Korean Intellectual Property Office, the disclosures of which are incorporated by reference herein in their entireties.

BACKGROUND

1. Field

The disclosure generally relates to a wireless communication system, and more particularly, to an antenna filter and an electronic device including the same in a wireless communication system.

2. Description of Related Art

Efforts to develop enhanced $5^{th}$ generation (5G) communication systems or pre-5G communication systems have been ongoing in order to meet the increasing demand for wireless data traffic since $4^{th}$ generation (4G) communication systems were commercialized. For this reason, the 5G communication systems or pre-5G communication systems are called Beyond 4G network communication systems or post long term evolution (LTE) systems.

The 5G communication system is considered to be implemented in a super high frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of radio waves and to increase a transmission distance of radio waves in the super high frequency band.

Moreover, technologies for evolved small cells, advanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

Electronic devices having a plurality of antennas mounted therein in order to enhance communication performance are developing, and it is expected that equipment having a large number of antennas by utilizing massive MIMO technology will be used. As the number of antenna elements in a communication device increases, the number of radio frequency (RF) components (for example, filters, etc.) that they accompany may inevitably increase.

SUMMARY

Provided are an apparatus and a method for miniaturizing a filter in a wireless communication system.

In addition, provided are an apparatus and a method for a filter having a suspended structure in a wireless communication system.

In addition, provided are an apparatus and a method for achieving the same performance as a metal cavity filter, through a filter having a suspended structure in a wireless communication system.

In addition, provided are an apparatus and a method for enhancing characteristics of a filter by generating a plurality of cross couplings in a wireless communication system.

According to an aspect of the disclosure, a filter in a wireless communication system, includes: a cover; a housing; a printed circuit board (PCB); a resonance plate provided between the cover and the PCB; and a plurality of resonators provided on a single layer in the resonance plate.

Each of the plurality of resonators may be a T-shaped resonance circuit.

The plurality of resonators may be serially connected.

The resonance plate may include a first area corresponding to the plurality of resonators, the first area being occupied by a conductor, and the resonance plate may include a second area corresponding an area other than the plurality of resonators, the second area being empty.

The PCB, the resonance plate, and the cover may be stacked in sequence in a first direction, a first surface of the resonance plate and the cover may be arranged to form a first air gap in the first direction, and a second surface of the resonance plate and the PCB may be arranged to form a second air gap in a second direction.

The resonance plate may include: an input port and an output port, and a radio frequency (RF) signal line connecting the input port and the output port, the input port is coupled to a first side of the housing, and the output port is coupled to a second side of the housing.

The RF signal line may be connected with the plurality of resonators.

The output port may be connected to an antenna element of an antenna array.

The housing may include a groove provided in inner part to accommodate the resonance plate.

The PCB may include at least one engagement groove for fastening to the housing.

The plurality of resonators may include at least one inductive load and at least one capacitive load, and an inductance value of each of the at least one inductive load and a capacitance value of each of the at least one capacitive load may be configured to pass an RF signal of a specific frequency band.

The inductance value of each of the at least one inductive load and the capacitance value of each of the at least one capacitive load may be configured to form a plurality of notches within a designated range from the specific frequency band.

Arrangements of the plurality of resonators may be related to a size of a cross coupling between nonadjacent resonators.

According to an aspect of the disclosure, a massive multiple input multiple output (MIMO) unit (MMU) device includes: at least one processor configured to process a signal; a plurality of filters configured to filter the signal; and an antenna array configured to radiate the signal, wherein the plurality of filters are arranged on a filter board, and wherein at least one of the plurality of filters includes: a resonance plate arranged between an upper cover and the filter board; and a plurality of resonators formed on a single layer in the resonance plate.

According to an aspect of the disclosure, a method of manufacturing a filter in a wireless communication system, includes: providing a resonance plate in which a plurality of resonators are formed on a single layer; coupling the resonance plate with a housing having a first height, the housing configured to enclose the resonance plate within a specific range of the first height; and performing surface mount technology (SMT) to mount a structure in which the resonance plate and the housing are coupled on a printed circuit board (PCB).

An apparatus and a method according to various embodiments of the disclosure may achieve miniaturization of a product through a filter having a suspended structure, and simultaneously, may enhance filter performance by generating a plurality of cross couplings.

The aspects of the disclosure are not limited to those mentioned above, and other aspects that are not mentioned above may be clearly understood to those skilled in the art based on the description provided below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
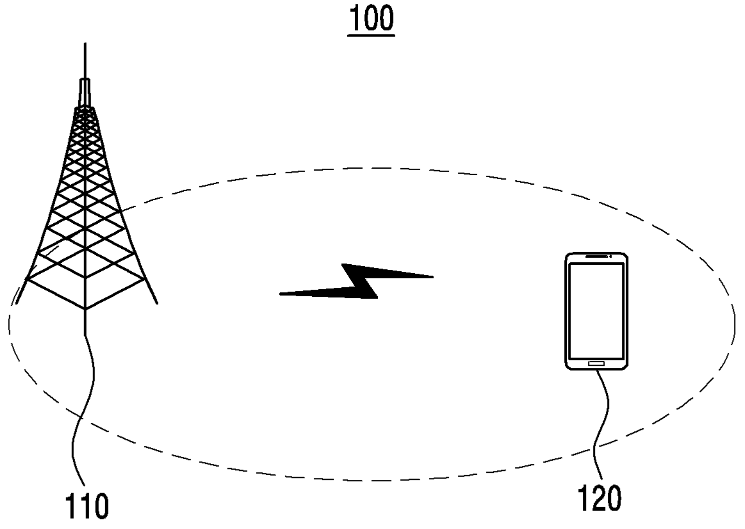
FIG. 1A is a view illustrating a wireless communication system according to various embodiments of the disclosure.

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

As used in the following descriptions, terms indicating components of an electronic device (for example, a substrate, a plate, a printed circuit board (PCB), a flexible PCB (FPCB), a module, an antenna, an antenna element, a circuit, a processor, a chip, an element, a device), terms indicating shapes of components (for example, a structure body, a structure, a support portion, a contact portion, a protrusion, an opening), terms indicating a connection portion between structure bodies (for example, a connection portion, a contact portion, a support portion, a contact structure body, a conductive member, an assembly), terms indicating circuits (for example, a PCB, an FPCB, a signal line, a feeding line, a data line, an RF signal line, an antenna line, an RF path, an RF module, an RF circuit) are merely examples for convenience of explanation. Accordingly, the disclosure is not limited to terms described below, and other terms having the same technical meanings may be used. In addition, such terms as " . . . portion," " . . . unit," or terms ending with suffixes "-er," and "-or" refer to at least one shape structure or a unit processing a function.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments by using terms used in some communication standards (for example, $3^{rd}$ generation partnership project (3GPP), institute of electrical and electronics engineers (IEEE)), but these embodiments are merely examples. Various embodiments of the disclosure may be easily modified and applied to other communication systems.

A metal cavity filter and a filter of a suspended structure mentioned in the disclosure may be determined according to an arrangement shape of a resonator. The metal cavity filter has a structure that includes a plurality of metal cavities and resonators provided in the respective cavities. Each resonator may be referred to as a 'pole.' However, the filter of the suspended structure has a structure that includes resonators on a single layer, that is, a suspended structure. There exist air gaps in an upper portion and a lower portion of the resonator. The filter of the suspended structure may include a plate in which the resonator is implemented between two air gaps.

In order to implement a magnetic cross coupling, a metal cavity resonator may be provided on a limited position (for example, a position where three poles form a triangle), and the metal cavity filter may include an additional structure (for example, a screw or tuning bolts) for adjusting them. However, since the filter of the suspended structure may transmit a radio frequency (RF) signal through an air layer without an obstacle like a structure for forming a metal cavity and an additional structure, the filter of the suspended structure may have a characteristic of generating relatively more cross couplings than the metal cavity filter.

The disclosure described hereinbelow relates to an antenna filter and an electronic device including the same in a wireless communication system. Specifically, the disclosure describes technology for achieving miniaturization of a product and enhanced filter performance by using a filter of a suspended structure, instead of a metal cavity filter, as an antenna filter in a wireless communication system.

FIG. 1A illustrates a wireless communication system according to embodiments of the disclosure. A wireless communication environment 100 of FIG. 1A includes a base station 110 and a terminal 120 as part of nodes using a wireless channel, by way of an example.

The base station 110 is a network infrastructure that provides wireless access to the terminal 120. The base station 110 has a coverage that is defined as a predetermined geographical area based on a distance by which a signal may be transmitted. The base station 110 may be referred to as "massive multiple input multiple output (MIMO) unit (MMU)," "access point (AP)", "eNodeB (eNB)", "5th generation (5G) node", "5G NodeB (NB)," "wireless point," "transmission/reception point (TRP)," "access unit," "distributed unit (DU)," "transmission/reception point (TRP)", "radio unit (RU)," "remote radio head (RRH), or other terms having the same technical meaning as the above-mentioned terms, in addition to the base station.

The terminal 120 is a device which is used by a user, and may communicate with the base station 110 through a wireless channel. In some cases, the terminal 120 may be operated without user's intervention. That is, the terminal 120 is a device which performs machine type communication (MTC), and may not be carried by a user. The terminal 120 may be referred to as "user equipment (UE)", "mobile station", "subscriber station", "customer premises equipment (CPE)," "remote terminal", "wireless terminal", "electronic device," "terminal for vehicle," "user device", or other terms having the same technical meaning as the above-mentioned terms, in addition to the terminal.

Figure 1B:
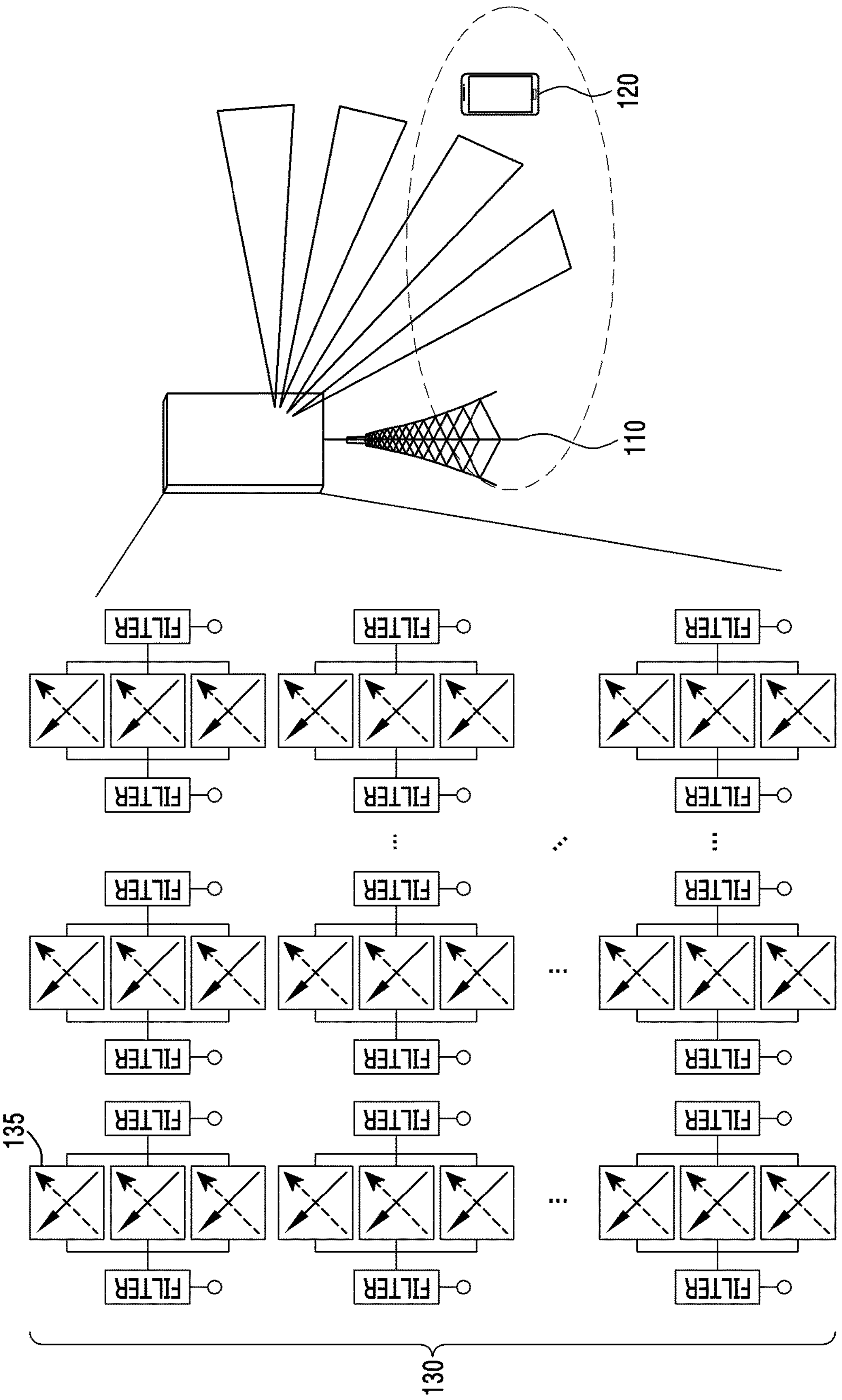
FIG. 1B is a view illustrating an example of an antenna array in a wireless communication system according to various embodiments of the disclosure.

FIG. 1B illustrates an example of an antenna array in a wireless communication system according to various embodiments of the disclosure. Beamforming may be used as one of techniques for mitigating a radio propagation path loss and increasing a transmission distance of radio propagation. Beamforming may generally concentrate an arrival area of radio propagation by using a plurality of antennas, or may increase directivity of a reception sensitivity regarding a specific direction. Accordingly, the base station 110 may include a plurality of antennas in order to form a beamforming coverage instead of forming a signal in an isotropic pattern by using a single antenna. Hereinafter, an antenna array including a plurality of antennas will be described. The example of the antenna array illustrated in FIG. 1B is merely an example for explaining embodiments of the disclosure, and is not interpreted as limiting other embodiments of the disclosure.

Referring to FIG. 1B, the base station 110 may include an antenna array 130. According to an embodiment, the base station 110 may include a massive MIMO unit (MMU) including the antenna array 130. Each antenna 135 included in the antenna array 130 may be referred to as an array element or an antenna element. In FIG. 1B, the antenna array 130 is illustrated as a two-dimensional planar array, but this is merely an example and does not limit other embodiments of the disclosure. According to another embodiment, the antenna array 130 may be configured in various forms like a linear array. The antenna array may be referred to as a massive antenna array.

According to an embodiment, a technique for enhancing data capacity of 5G communication may be the beamforming technique which uses an antenna array connected with a plurality of RF paths. In order to increase data capacity, the number of RF paths should increase or power per RF path should increase. Increasing RF paths may result in increasing in size of a product, and currently, it is almost impossible to increase RF paths due to space restrictions in installing real base station equipment. A splitter (or divider) may be used in the RF path in order to increase an antenna gain through a high output without increasing the number of RF paths. Accordingly, a plurality of antenna elements may be connected by using the splitter, and the antenna gain may increase.

The number of antennas (or antenna elements) of equipment (for example, the base station 110) performing wireless communication is increasing in order to enhance communication performance. In addition, the number of RF components (for example, an amplifier, a filter), components for processing RF signals received or transmitted through antenna elements increases. Accordingly, in configuring communication equipment, the equipment may be required to achieve a spatial gain, cost efficiency while satisfying communication performance. As the number of paths increases, the number of filters for processing a signal in each antenna element also increases.

A filter may include a circuit for filtering to transmit a signal of a desired frequency by forming a resonance. That is, the filter may perform a function of selectively identifying a frequency. A desired filter characteristic may be obtained by a shape structure applied to the filter, but there may be restrictions on performance resulting therefrom. Many techniques have been suggested to minimize a loss in performance caused by an applied shape. In particular, there is a need for miniaturization of a filter and reduction of weight in order to arrange a plurality of filters in a restricted space. For example, a metal cavity filter may require a separate material (for example, metal) for fixing, and each resonator is very sensitive, and therefore, has a disadvantage of having to be tuned by hand through a screw. Such tuning may degrade mass production, may cause a high defect rate, and may increase a price of the filter. Accordingly, the metal cavity filter may be stable in terms of performance, but may not be appropriate in terms of mass production as the number of antenna elements and the number of RF paths increase. To solve these problems and replace a related-art filter (for example, a metal cavity filter), according to an embodiment, there is provided a structure which is simple and efficient while optimizing performance through a filter having a suspended structure.

Figure 2:
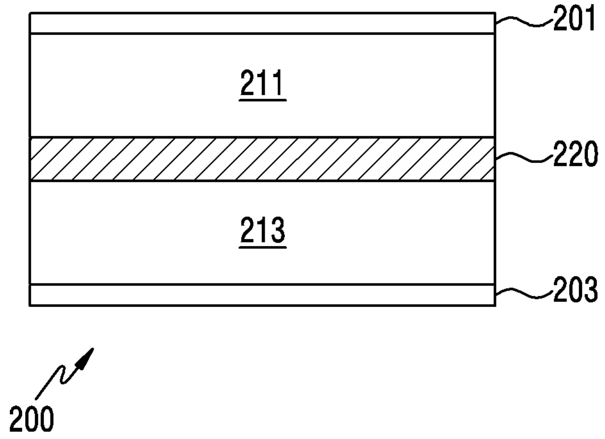
FIG. 2 is a view illustrating a cross section of a suspended structure according to various embodiments of the disclosure.

FIG. 2 illustrates a cross section of a suspended structure according to various embodiments of the disclosure. The suspended structure according to various embodiments of the disclosure refers to a structure in which a resonator is disposed in a space of a filter. Two air gaps may be formed on an upper surface and a lower surface of a plate where a resonator is formed, respectively. In other words, the suspended structure may refer to a structure including a resonator plate between two air gaps. As described above, the suspended structure according to various embodiments of the disclosure may be used to reduce a size of a filter compared to a filter including a metal cavity resonator.

Referring to FIG. 2, a filter 200 may include a first substrate 201, a second substrate 203, a resonance plate 220. The resonance plate 220 may be referred to by various terms. For example, the resonance plate 220 may be referred to as a suspended plate. In addition, for example, the resonance plate 220 may be referred to as an intermediate plate. In addition, for example, the resonance plate 220 may be referred to as an intercept plate or an intercepted plate. In addition, for example, the resonance plate 220 may be referred to as a buffer plate. In the disclosure described hereinbelow, the resonance plate 220 may be referred to as a suspended plate 220, but other terms may be used. In other words, the suspended plate 220 is merely a term for indicating a resonator plate disposed through a suspended structure, and the term itself is not interpreted as limiting a specific function or configuration.

The first substrate 201 may be disposed to face an upper surface of the suspended plate 220, and the second substrate 201 may be provided to face a lower surface of the suspended plate 220. According to an embodiment, the first substrate 201 may be a cover and the second substrate 203 may be a board for arranging the filter 200. According to an embodiment, the board may be a printed circuit board (PCB). The first substrate 201 and the second substrate 203 may form a space in the filter 200 along with a housing enclosing a side surface. The first substrate 201, the second substrate 203, and the housing are referred to as a structure for forming a space, but these are merely an example of a structure for forming an air gap therein and are not interpreted as limiting the suspended structure of the disclosure. For example, in order to form an inner space, at least one of the first substrate 201 or the second substrate 203 may be implemented as one structure along with the housing enclosing the side surface.

The suspended plate 220 may be disposed in the space formed by the first substrate 201 and the second substrate 203. The suspended plate 220 is disposed between the first substrate 201 and the second substrate 203, such that the formed space is divided into a first air gap 211 and a second air gap 213. The first air gap 211 may be positioned between one surface of the suspended plate 220 and the first substrate 201. The second air gap 213 may be positioned between the other surface of the suspended plate 220 and the second substrate 203. Since the suspended plate is disposed between the two air gaps, the suspended plate may be referred to as a suspended air strip, a suspended air plate or terms having the same meaning as these. A resonator implemented on the suspended plate may be referred to as a suspended resonator, a suspended air strip resonator or terms having the same meaning as these.

The resonator of the filter 200 may be implemented on the suspended plate 200. A loss of dielectric may be reduced due to the air gap of the filter 200. The reduction of the loss of the dielectric may provide enhancement of characteristics of an insertion loss and a reflection coefficient. These characteristics may solve disadvantages of a metal cavity while providing the same or similar performance as or to that of the metal cavity filter. Accordingly, the filter according to various embodiments of the disclosure proposes a solution for miniaturizing a product and minimizing a process error while providing performance for replacing the metal cavity filter, through the suspended structure.

Figure 3:
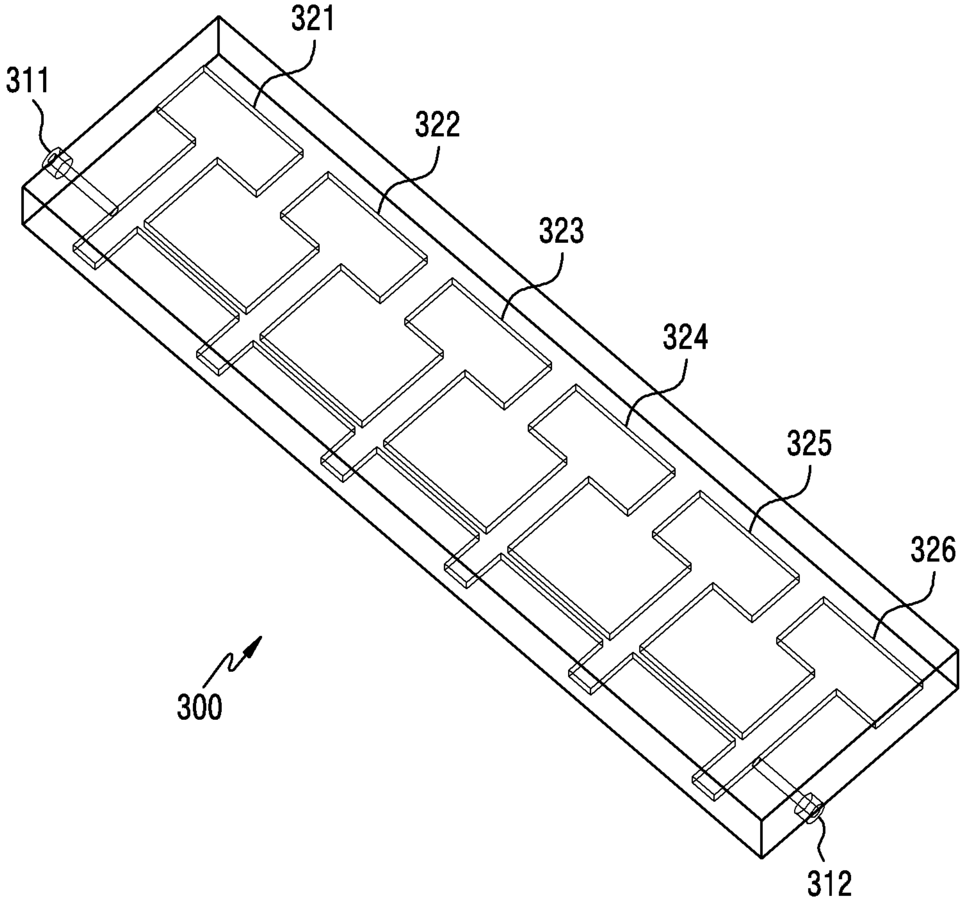
FIG. 3 is a view illustrating an example of a filter having a suspended structure according to various embodiments of the disclosure.

FIG. 3 illustrates an example of a filter 300 having a suspended structure according to various embodiments of the disclosure. The filter 300 of FIG. 3 exemplifies the filter 200 of FIG. 2 having the suspended structure. The filter 300 of FIG. 3 may include a resonance circuit which is implemented on a suspended plate.

Referring to FIG. 3, the filter 300 may include an input port 311 and an output port 312. An RF signal may be applied to the input port 311. The filter 300 may deliver some frequency components of the RF signal, which is received through the input port 311, to the output port 312 through an operation of a resonator, which will be described below. The filtered RF signal may be delivered to an antenna through the output port 312. Herein, the antenna may correspond to an antenna element of an antenna array or a subarray.

The filter 300 may include a resonance circuit. A phenomenon in which, when a periodicity of a structure (for example, a cavity) of a resonance circuit and a periodicity of a signal match each other, energy of a frequency corresponding to the corresponding period is delivered without being lost is referred to as resonance. An inductive load and a capacitive load of the filter may be designed through structural arrangement, so that the filter may control a component of a desired frequency band of the RF signal and a component of an undesired frequency band. A characteristic of passing a component of a desired frequency band is referred to as a band passing characteristic, and a characteristic of blocking a component of an undesired frequency band is referred to as a band blocking characteristic.

The resonance circuit of the filter 300 may include a plurality of resonators. The filter 300 may include a first resonator 321, a second resonator 322, a third resonator 323, a fourth resonator 324, a fifth resonator 325, a sixth resonator 326. A suspended structure of a single layer (that is, a two-dimensional shape) may be implemented in a filter through a resonance circuit implemented on a suspended plate instead of a resonance circuit of a related-art metal cavity filter (for example, the related art resonators having metal cavities). A plurality of resonators are formed by a single plate (for example, a suspended plate) rather than arranging resonators within metal cavities and arranging individual tuning bolts between the resonators, so that an assembly process may be simplified. The six resonance circuits of FIG. 3 are merely an example as an exemplary structure of the filter 300, and are not interpreted as limiting other embodiments of the disclosure.

According to various embodiments, each resonator may include a resonator having a T-shape (hereinafter, a T-shaped resonator). The T-shaped resonator may be included in the suspended plate (for example, the suspended plate 220 of FIG. 2) to miniaturize the filter 300. The T-shaped resonator refers to a circuit in which passive elements providing a resonant frequency are arranged in a 'T' shape. According to an embodiment, the passive elements may be a capacitor, an inductor or resistance. An area of the resonator on the single layer may be reduced through the T-shaped arrangement instead of a linear arrangement. The resonant frequency may be determined through arrangement and values of an inductive load (for example, inductance) and a capacitive load (for example, capacitance) of the resonator, and this is used to allow a specific frequency band to pass. A dimension or a structural characteristics of the T shape (for example, a height, a width, and a size) may be determined according to an inductance value and a capacitance value required. The T-shaped resonator may be connected to an RF signal line of the input port and the output port.

According to an embodiment, the plurality of resonators may be arranged serially in one direction. The T-shaped resonators may be serially arranged along an RF signal line. In this case, an inductive load or capacitive load of a specific resonator may cause a coupling with an inductive load or capacitive load of another specific resonator that is not adjacent. A size and a position of each resonator may be related to a size of a cross coupling. A plurality of T-shaped resonators may be designed by considering an S-parameter according to a cross coupling effect (for example, a cross coupling characteristic of FIGS. 5A and 5B), which will be described below through FIGS. 5A and 5B. A size and A position of each T-shaped resonator may be determined according to requirements of the filter. The T-shaped resonator may provide an effect of reducing the size of the filter, along with characteristics of the suspended structure.

Figure 4:
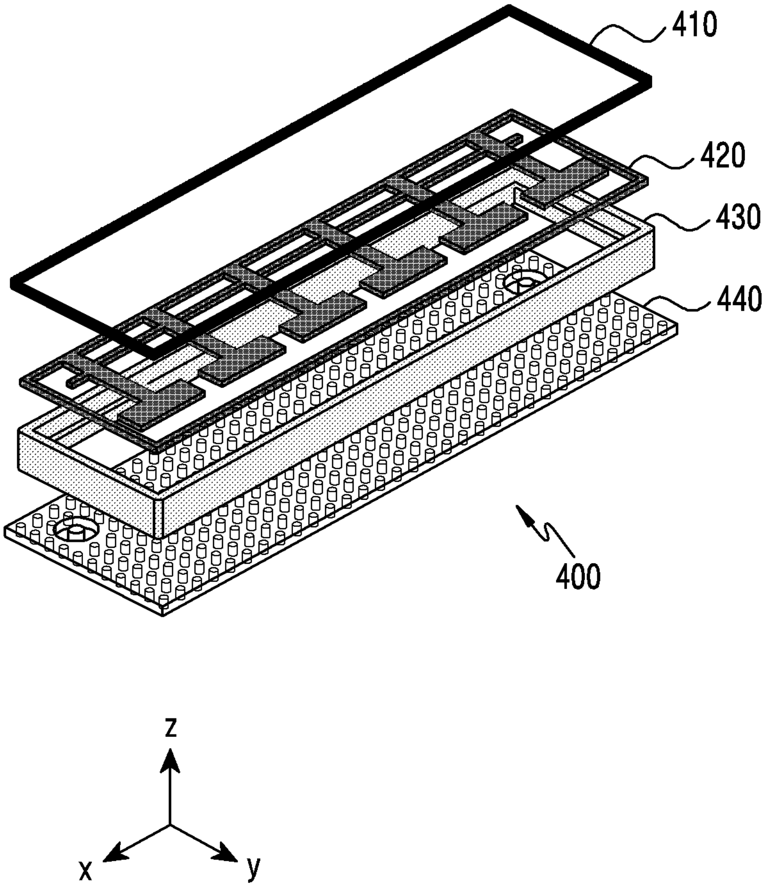
FIG. 4 is an exploded perspective view of a filter having a suspended structure according to various embodiments of the disclosure.

FIG. 4 is an exploded perspective view of a filter having a suspended structure according to various embodiments of the disclosure. The filter 400 exemplifies the filter 200 of FIG. 2 and the filter 300 of FIG. 3 having the suspended structure. A manufacturing process of the filter 400 will be described through the exploded perspective view of FIG. 4.

Referring to FIG. 4, the filter 400 may include a plurality of structures stacked one on another in the z-axis direction. The filter 400 may include a cover 410, a suspended plate 420, a housing 430, and a PCB 440. The cover 410, the housing 430, and the PCB 440 may form an inner space in the filter 300. The inner space may include an air gap as a medium. The inner space may include the air gap that is divided by insertion of the suspended plate 420. The suspended plate may be referred to as a suspended air plate. As mentioned in FIG. 3, a resonance circuit may be implemented on the suspended plate 420. An area of the resonance circuit of the suspended plate 420 that corresponds to the plurality of resonators may be formed by a conductor. That is, the area of the resonance circuit of the suspended plate 420 may be occupied by the conductor. In addition, areas other than the plurality of resonators may be empty. In other words, the plurality of resonators may be formed on a single layer. It is noted that this structure differs from a structure in which suspended strip lines are arranged on one dielectric plate.

According to an increasing number of antennas, complexity of RF components for processing an RF signal may increase. Due to a lease cost or space restrictions of an installation place, the RF components (antenna element/filter/power amplifier/transceiver, etc.) may be required to be small and light and to be manufactured at a low cost. In addition, as communication equipment is implemented with a plurality of RF components being assembled, a tolerance occurring every time the RF components are assembled may increase, which may cause degradation of performance. In addition, a cost for satisfying required communication performance may also work as an overhead due to a structural difference, a difference in electrical characteristics even if the same function is performed. Instead of including a screw for fastening between structures and a tuning bolt for controlling a cross coupling, the resonance circuit for operating the filter 400 may be implemented on the suspended plate 420 by a single layer, so that a manufacturing process may be more simplified. In addition, a filter having a cross coupling effect may be implemented without an additional structure, thanks to an air gap. The filter 400 may minimize an insertion loss occurring due to coupling with an additional structure, and an error caused by a coupling process, so that mass production is easily achieved.

According to an embodiment, the PCB 440, the suspended plate 420, and the cover 410 may be arranged to be stacked in sequence with reference to the (−) z-axis direction. In this case, a first surface of the suspended plate 420 along the (+) z-axis and the cover 410 may be disposed to form a first air gap along the z-axis, and a second surface of the suspended plate 420 along the (−) z-axis and the PCB 440 may be disposed to form a second air gap along the z-axis.

According to an embodiment, the suspended plate 420 may include an input port and an output port, and an RF signal line connecting the input port and the output port. In other words, the input port, the output port, and the RF signal line may be formed within the same layer as the resonators of the suspended plate 420. According to an embodiment, the suspended plate 420 may have such a shape that the plurality of resonators are connected to the RF signal line. The input port may be coupled to one side of the housing 430, and the output port may be coupled to the other side of the housing 430.

According to an embodiment, the housing 430 may include a groove formed therein to accommodate the suspended plate 420. Through the groove, the suspended plate 420 may be more easily fastened to the housing 430. The suspended plate 420 may be disposed in the filter 400 to form a designated gap from the PCB 440 or the cover 410, so that an error caused by assembly may be minimized. However, the disclosure is not limited to a groove. As such, according to another embodiment, the suspended plate 420 may be fastened to the housing 430 in another manner.

According to an embodiment, the filter 400 may be disposed on a PCB (for example, the PCB 440) through surface mount technology (SMT), so that a manufacturing process may be simplified. SMT may be applied to simplify an assembly process between connection components (e.g., the cover 410, the housing 420, the PCB 440 for forming a space, and the suspended plate 430 including a resonance circuit). Filters including the suspended structure according to various embodiments of the disclosure may be mounted on a filter board (e.g., the PCB 440 of FIG. 4) through SMT, so that an effect of mass production may be more maximized. According to another embodiment, the PCB may include one or more engagement grooves for fastening with the housing.

As described through FIG. 4, the filter 400 may be formed not only with the suspended plate 420 but also with the input port, the output port, the RF signal line in the single layer without an additional structure. In addition, the filter 400 may be implemented as a single component along with the cover 410, the housing 420, the PCB 440. The filter 400 implemented as the single component may be easy to mass-produce, and as shown in FIG. 1B, the filter may be easily coupled to each antenna integrated into the antenna array. In particular, due to a low process error and a low assembly error, the filter may also enhance performance compared to other filters.

Figure 5A:
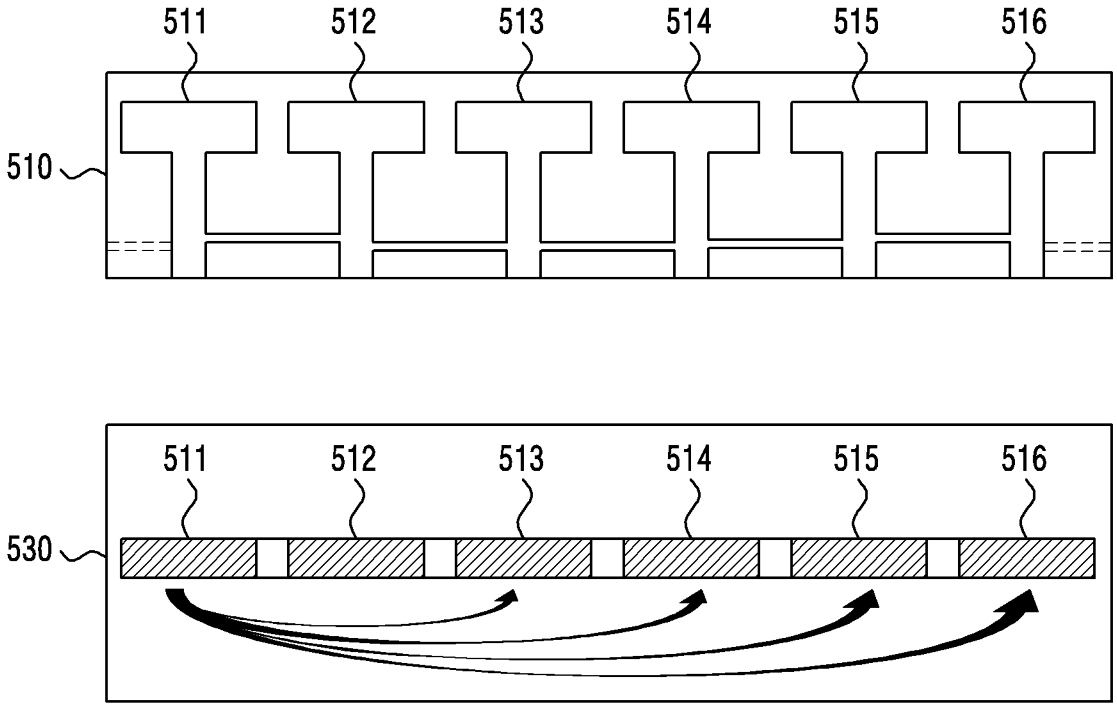
FIG. 5A is a view illustrating an example of a cross coupling of a filter having a suspended structure according to various embodiments of the disclosure.

FIG. 5A illustrates an example of a cross coupling of a filter having a suspended structure according to various embodiments of the disclosure. The filter exemplifies the filter 400 of FIG. 4 having the suspended structure. Herein, the cross coupling refers to a coupling between resonators, not a sequential coupling.

Referring to FIG. 5A, a plane view 510 illustrates a resonance circuit on a suspended plate (for example, the suspended plate 420 of FIG. 4) when viewed above (for example, the (−) z-axis direction of FIG. 4). The resonance circuit of the filter 400 may include a first resonator 511, a second resonator 512, a third resonator 513, a fourth resonator 514, a fifth resonator 515, a sixth resonator 516. However, the number of resonators are not limited to six, and as such, according to another embodiment, the resonance circuit of the filter 400 may include a different number of resonators. A front view 530 illustrates a filter (for example, the filter 400 of FIG. 4) when viewed from the front (for example, (−) y-axis direction of FIG. 4). The front view 530 illustrates a cross coupling between nonadjacent resonators, as a contrary concept of the sequential coupling. For example, a coupling between the first resonator 511 and the second resonator 512 may not correspond to the cross coupling. A coupling between the first resonator 511 and a resonator that is not adjacent thereto corresponds to the cross coupling. For example, a coupling between the first resonator 511 and the third resonator 513, a coupling between the first resonator 511 and the fourth resonator 514, a coupling between the first resonator 511 and the fifth resonator 515, or a coupling between the first resonator 511 and the sixth resonator 516 corresponds to the cross coupling.

Figure 5B:
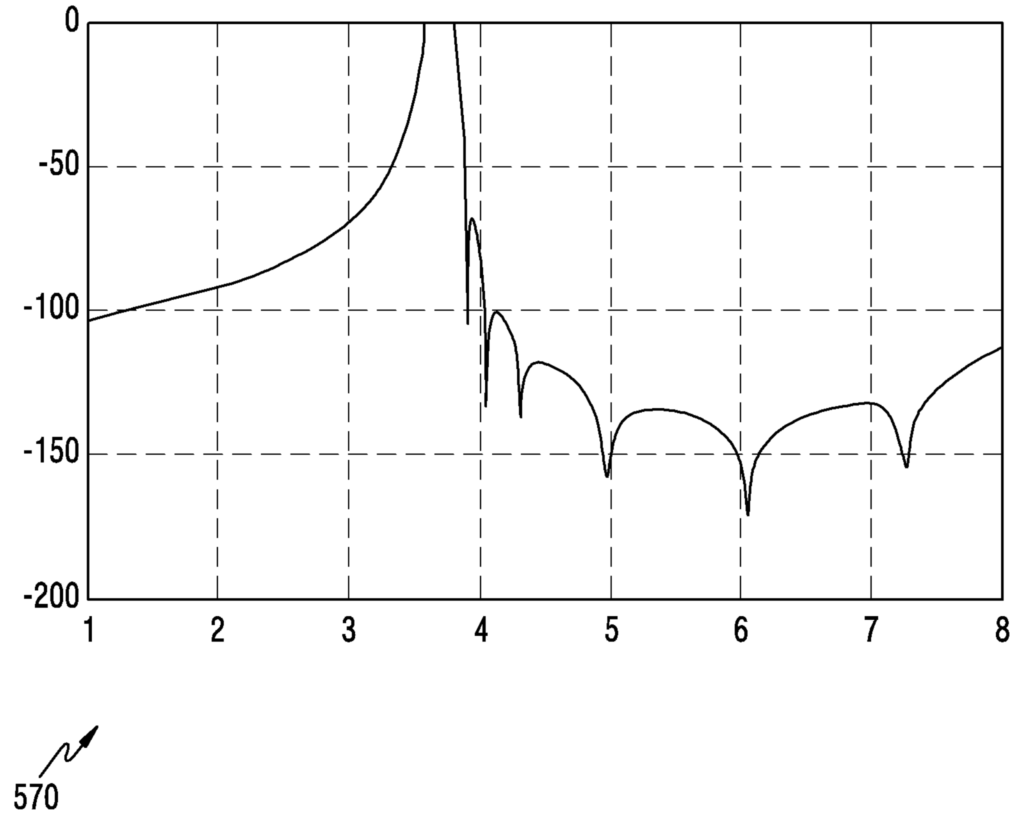
FIG. 5B is a view illustrating an example of performance of a filter according to a cross coupling of the filter having a suspended structure according to various embodiments of the disclosure.

FIG. 5B illustrates an example of performance of a filter according to a cross coupling of the filter having a suspended structure according to various embodiments of the disclosure. The performance refers to an S-parameter indicating a ratio of an output signal according to an input signal.

Referring to FIG. 5B, a graph 570 indicates an S-parameter $S_{21}$ as a characteristic of the filter 400. The horizontal axis indicates a frequency (unit: GHz), and the vertical axis indicates $S_{21}$ (unit: dB). $S_{21}$ indicates a transmission coefficient, and through $S_{21}$, band passing performance of the filter may be identified, and simultaneously, a band blocking characteristic may be identified. According to an embodiment, the filter 400 may include a band pass filter to pass a signal of a specific band (for example, a band from about 3.5 GHz to 3.8 GHz). Referring to bands from about 3.5 GHz to 3.8 GHz of the graph 570, high $S_{21}$ close to 0 dB may be identified. That is, an RF signal in a pass band may pass through the filter 400 without a loss. On the other hand, it may be identified that, in bands after 4 GHz, notches (for example, a first notch (about 3.9 GHz), a second notch (about 4.1 GHz), a third notch (about 4.4 GHz), a fourth notch (about 5 GHz), a fifth notch (about 6.1 GHz), a sixth notch (about 7.3 GHz)) are formed.

The performance of the filter may include a band passing characteristic and an attenuation characteristic. The band passing characteristic may be determined through resonance by a combination of an inductive load and a capacitive load. The attenuation characteristic of the filter may include an insertion loss and a skirt characteristic. The insertion loss indicates a characteristic that inputted power is not sufficiently outputted and works as a loss due to insertion of an element or a circuit. The skirt characteristic refers to a slope in a boundary band (for example, after 3.8 GHz) in a band passing characteristic curve (for example, the graph 570 of FIG. 5B). A steep slope may indicate a high passing characteristic. In other words, occurrence of a notch indicating a low passing coefficient enhances the skirt characteristic in the boundary band. The skirt characteristic may be enhanced as an order of the filter increases, that is, the number of resonators increases, but in reverse proportion thereto, the insertion loss may increase. In order to maintain a constant insertion loss, the resonators (the first resonator 511, the second resonator 512, the third resonator 513, the fourth resonator 514, the fifth resonator 515, the sixth resonator 516) of the filter 400 according to various embodiments may be disposed to form a notch by the cross coupling.

The notch formed at a low point of the graph 570 of the $S_{21}$ parameter means that many RF signals do not pass in the corresponding frequency band. That is, the notch formed at the low point means a high reflection loss, which means that the filter blocks an RF signal of the corresponding frequency band. By passing a signal of a specific frequency band and simultaneously blocking a signal of another frequency band adjacent thereto, the performance of the filter may be more enhanced.

A related-art metal cavity filter may require a triangle arrangement having three resonators (that is, three poles) as vertexes due to restrictions on a distance between resonators and structural restrictions of the metal cavity. The purpose of the triangle arrangement is for enhancing the band pass filter characteristic by forming a notch. In addition, the metal cavity filter may require an additional structure (for example, a tuning bolt) in order to adjust a cross coupling. The arrangement required to form the notch, and the additional structure may cause the size of the filter to increase. However, the filter of the suspended structure according to various embodiments of the disclosure may not require a metal cavity to be formed, and may transmit an RF signal through the air gap (for example, the first air gap 211 or the second air gap 213 of FIG. 2). Accordingly, since an even short distance is enough for an RF signal to cause a cross coupling, miniaturization of the filter may be achieved. In addition, since an additional structure for forming a cross coupling is not required, a manufacturing process may also be simplified. In other words, the filter may generate more cross couplings within a restricted size than the metal cavity filter, and may form a plurality of notches. This results in enhancement of the skirt characteristic and enhancement of the S-parameter characteristic of the filter.

FIG. 5A illustrates a cross coupling between the first resonator 511 and the third resonator 51, a cross coupling between the first resonator 511 and the fourth resonator 514, a cross coupling between the first resonator 511 and the fifth resonator 515, and a cross coupling between the first resonator 511 and the sixth resonator 516 in order to explain the cross coupling. However, this is merely an example for explaining the first resonator 511 in order to explain the cross coupling. That is, the second resonator 512 may form a cross coupling with the fourth resonator 514, the fifth resonator 515, the sixth resonator 516, respectively. Likewise, all of the third resonator 513, the fourth resonator 514, the fifth resonator 515, the sixth resonator 516 may form a cross coupling with other resonators (for example, nonadjacent resonators). As described above, since the resonators of the resonance circuit implemented on the suspended plate use the air gap as a medium to easily transmit an RF signal of a specific resonator to another resonator, the resonators may form more cross couplings within a limited size than a filter of metal cavity resonators (in other words, a metal cavity filter). In addition, if the same or similar performance (for example, S-parameter $S_{11}$ or $S_{21}$) is guaranteed, a filter smaller than a metal cavity filter may be implemented through a suspended structure.

Figure 6A:
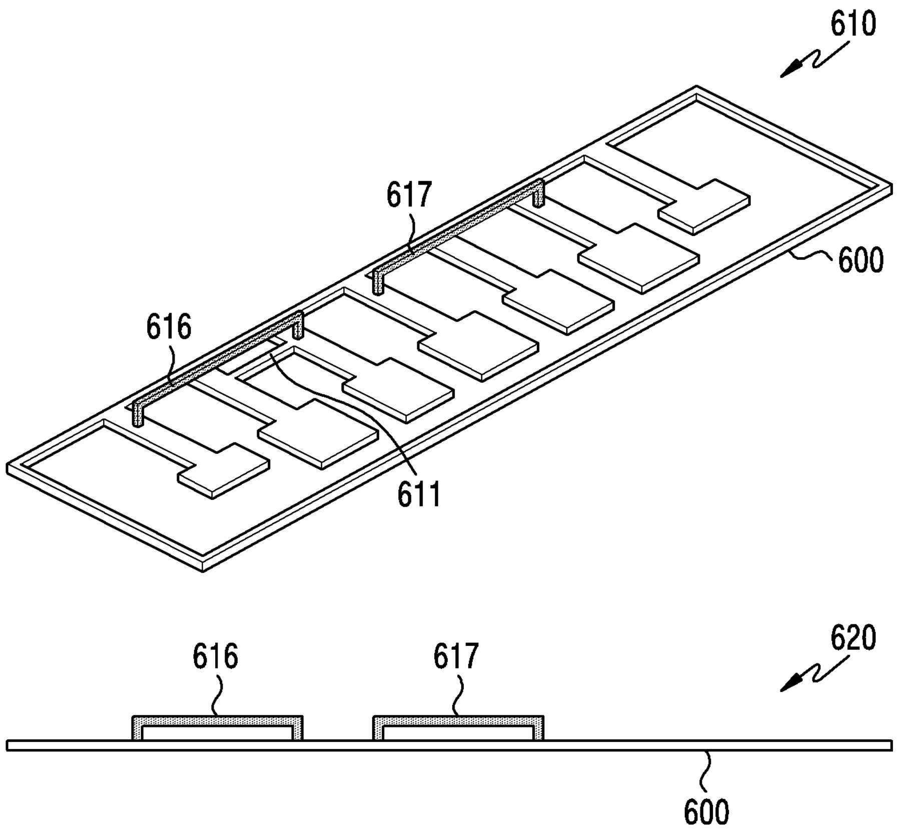
FIG. 6A is a view illustrating an example of arrangement of a strip for a cross coupling in a filter having a suspended structure according to embodiments of the disclosure.

FIG. 6A illustrates an example of arrangement of a strip for a cross coupling in a filter having a suspended structure according to embodiments of the disclosure. It is possible to implement a required cross coupling structure through a strip added to a suspended plate of a filter.

Referring to FIG. 6A, a perspective view 610 illustrates a stereoscopic structure of a suspended plate to which a strip is added. A front view 620 is a view of the suspended plate as viewed from the front. The filter 600 may include a resonance circuit implemented on a suspended plate as described with reference to FIGS. 3 and 4. The filter 600 may include an input port and one or more output ports. The filter 600 may include the resonance circuit. The resonance circuit of the filter 600 may include a plurality of resonators. According to an embodiment, each resonator may include a resonator having a T-shape (hereinafter, a T-shaped resonator). According to an embodiment, the plurality of resonators may be arranged serially in one direction. In this case, a specific resonator may cause a coupling with nonadjacent another specific resonator.

According to an embodiment, the filter 600 may include a strip 611 for a magnetic coupling between adjacent resonators. According to an embodiment, the filter 600 may include strips 616, 617 for a cross coupling between nonadjacent resonators. The nonadjacent resonators are connected through arrangement of the strip, so that the resonance circuit of the filter 600 may generate a required cross coupling.

Figure 6B:
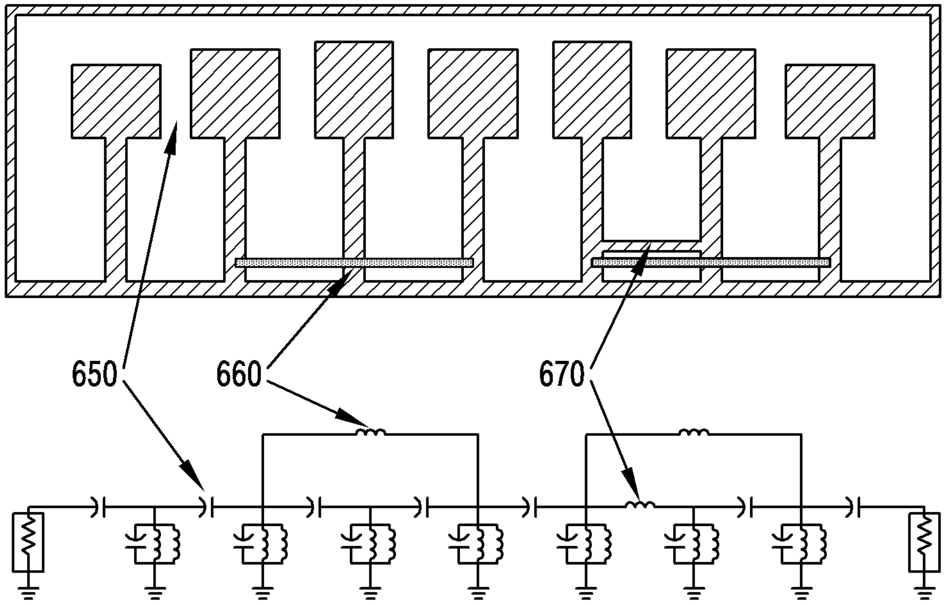
FIG. 6B is a view illustrating an example of coupling connections in a filter having a suspended structure according to embodiments of the disclosure.

FIG. 6B illustrates an example of coupling connections in a filter having a suspended structure according to various embodiments of the disclosure. A resonance circuit of the filter 600 may include a plurality of resonators. Each resonator may be expressed by an RLC combination (a combination configured by using at least one of a resistor (R), an inductor (L), and a capacitor (C)). A connection of a strip line may be expressed as an inductor (L).

Referring to FIG. 6B, the plurality of resonators may be arranged serially in one direction. In this case, a coupling between adjacent resonators may be referred to as an electric coupling 650. The electric coupling between adjacent resonators may form a capacitive load.

According to an embodiment, a strip line may be disposed between nonadjacent resonators. When the strip line is disposed between nonadjacent resonators, a coupling between the nonadjacent resonators may be referred to as a magnetic cross coupling 660. The magnetic cross coupling between the nonadjacent resonators may form an inductive load.

According to an embodiment, a strip line may be disposed between adjacent resonators. When the strip line is disposed between adjacent resonators, a coupling between the adjacent resonators may be referred to as a magnetic coupling 670. The magnetic coupling between the adjacent resonators may form an inductive load. Adjacent resonators may also form a coupling load as described above, although it is not illustrated in FIG. 6B.

As described through FIGS. 6A and 6B, the inductive load or capacitive load formed in the resonance circuit of the suspended plate may vary according to arrangement of an additional strip. The load characteristic of the resonance circuit may influence performance of the filter 600. Specifically, a passing coefficient may vary based on coupling performance, and in particular, a cross coupling may be related to occurrence of a notch. Occurrence of a notch indicating a low passing coefficient enhances the skirt characteristic in a boundary band.

Figure 7A:
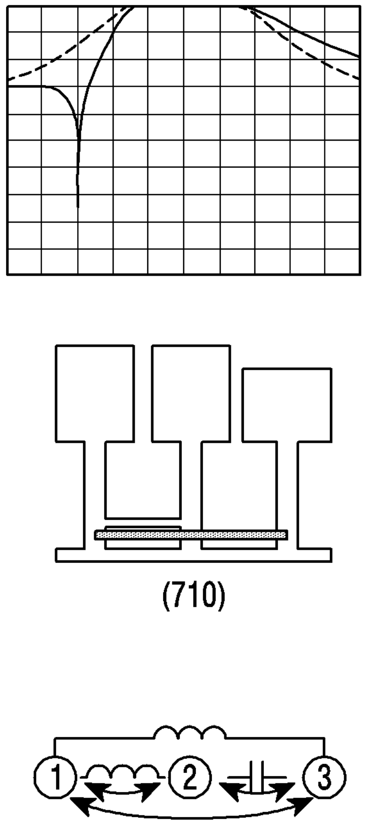
FIG. 7A illustrates examples of filter performance according to strip arrangement in a filter having a suspended structure according to embodiments of the disclosure.
Figure 7B:
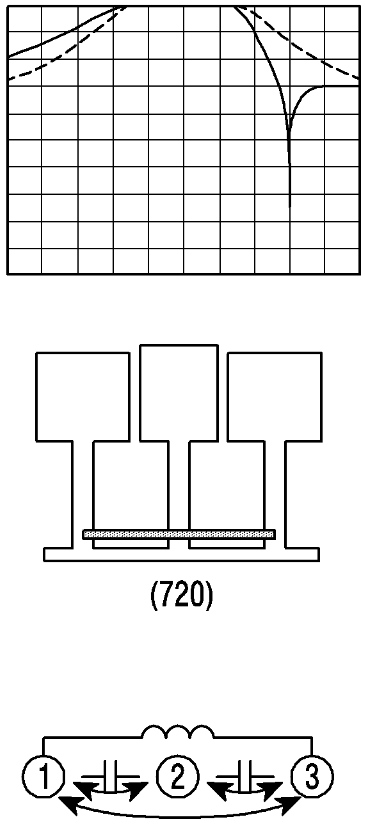
FIG. 7B illustrates examples of filter performance according to strip arrangement in a filter having a suspended structure according to embodiments of the disclosure.
Figure 7C:
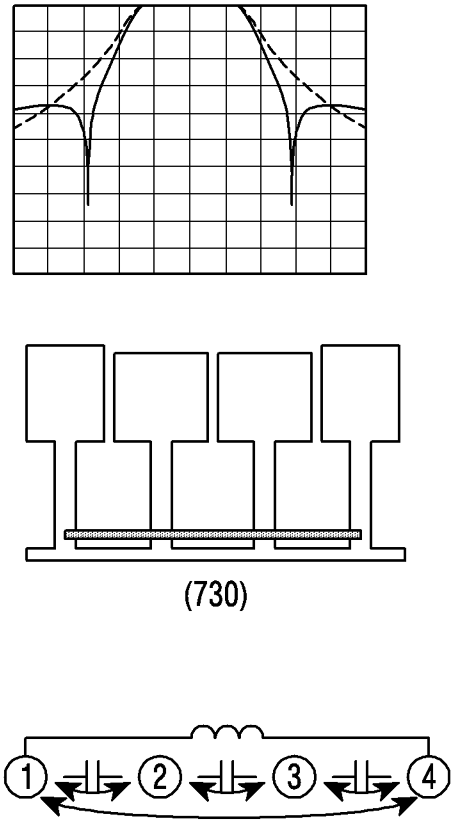
FIG. 7C illustrates examples of filter performance according to strip arrangement in a filter having a suspended structure according to embodiments of the disclosure.

FIGS. 7A, 7B, and 7C—illustrate examples of filter performance according to strip arrangement in a filter having a suspended structure according to various embodiments of the disclosure.

Referring to FIG. 7A, in a first example 710, a first resonator, a second resonator, a third resonator may be connected serially, and the first resonator and the second resonator which are adjacent to each other may be connected by a strip, and the first resonator and the third resonator which are not adjacent to each other may be connected by a strip. An inductive load may be formed between the first resonator and the second resonator through the strip According to an embodiment, an effective capacitive connection may also exist between the first resonator and the second resonator.

Referring to FIG. 7B, in a second example 720, a first resonator, a second resonator, a third resonator may be connected serially, and the first resonator and the third resonator which are not adjacent to each other may be connected by a strip. A skirt characteristic may appear in a high frequency band. A capacitive load may be formed between two adjacent resonators. An inductive load may be formed in the first resonator and the third resonator which are not adjacent to each other.

Referring to FIG. 7C, in a third example 730, a first resonator, a second resonator, a third resonator, and a fourth resonator may be connected serially, and the first resonator and the fourth resonator which are not adjacent to each other may be connected by a strip. A capacitive load may be formed between two adjacent resonators. An inductive load may be formed in the first resonator and the third resonator which are not adjacent to each other. Through strip arrangement connecting the four resonators, a skirt characteristic appears on both sides with reference to a pass band.

Figure 8:
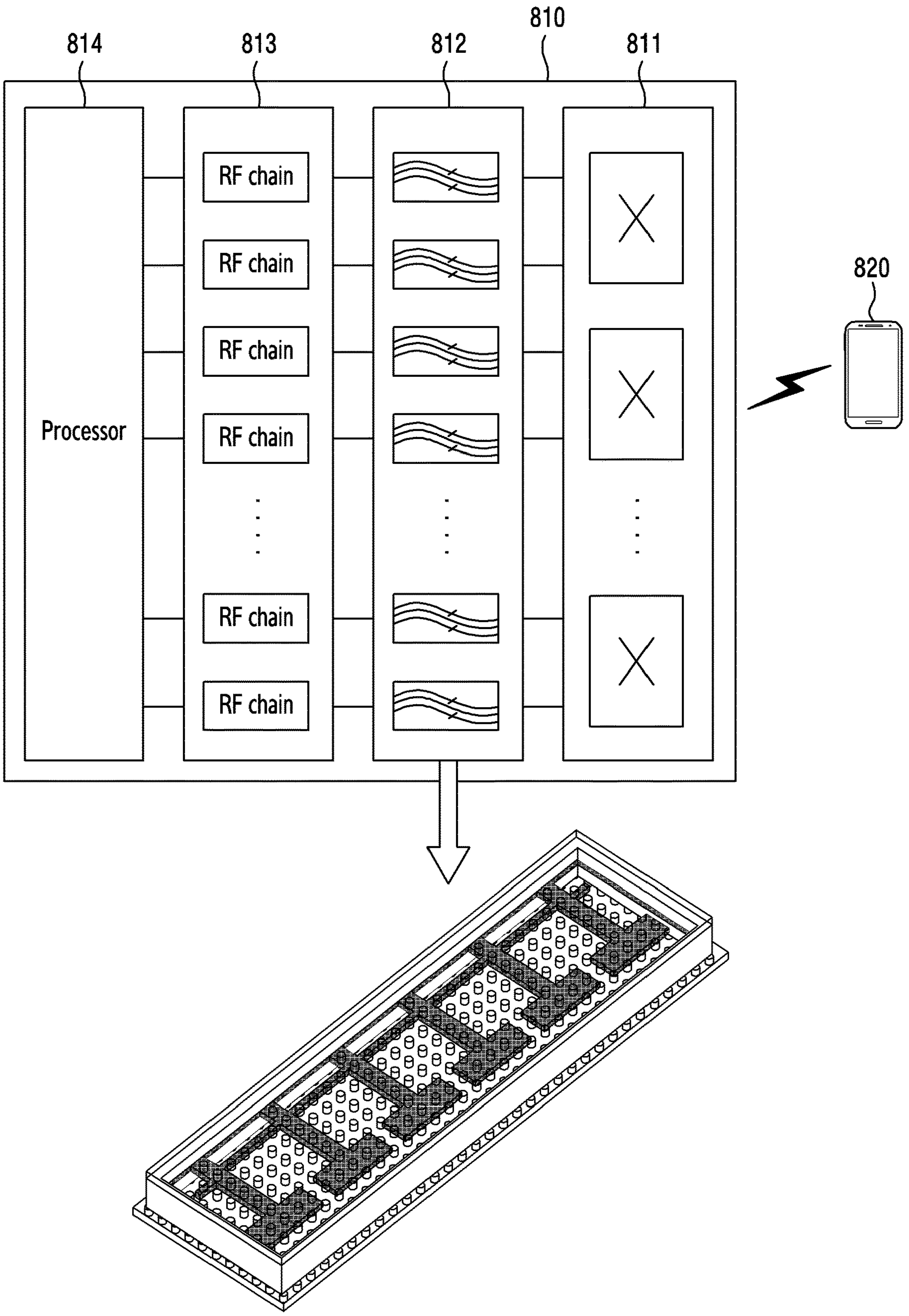
FIG. 8 is a view illustrating a functional configuration of an electronic device including a filter having a suspended structure according to various embodiments of the disclosure.

FIG. 8 illustrates a functional configuration of an electronic device including a filter having a suspended structure according to various embodiments of the disclosure. The electronic device 810 may be one of the base station 110 or the terminal 120 of FIG. 1A. According to an embodiment, the electronic device 810 may be an MMU. Not only the antenna structure mentioned through FIGS. 1A to 7, but also the electronic device including the same is included in embodiments of the disclosure. The electronic device 801 may include a filter having a suspended structure in an input and output path of an RF signal.

Referring to FIG. 8, an exemplary functional configuration of the electronic device 810 is illustrated. The electronic device 810 may include an antenna unit 811, a filter unit 812, a radio frequency (RF) processing unit 813, and a controller 814.

The antenna unit 811 may include a plurality of antennas. The antenna performs functions of transmitting and receiving signals through a wireless channel. The antenna may include a conductor formed on a substrate (for example, a PCB), or a radiator formed of a conductive pattern. The antenna may radiate an up-converted signal on a wireless channel, or may acquire a signal radiated by another device. Each antenna may be referred to as an antenna element or an antenna component. In some embodiments, the antenna unit 811 may include an antenna array in which a plurality of antenna elements form an array. The antenna unit 811 may be electrically connected with the filter unit 812 through RF signal lines. The antenna unit 811 may be mounted on a PCB including a plurality of antenna elements. The PCB may include a plurality of RF signal lines connecting the respective antenna elements and filters of the filter unit 812. The RF signal lines may be referred to as a feeding network. The antenna unit 811 may provide a received signal to the filter unit 812 or may radiate a signal provided from the filter unit 812 to the air.

The filter unit 812 may perform filtering in order to transmit a signal of a desired frequency. The filter unit 812 may perform a function of selectively identifying a frequency by forming resonance. According to various embodiments, the filter unit 812 may include a resonator having a suspended structure according to various embodiments of the disclosure. The filter unit 812 may include a resonator of a plate type in which air gaps are formed on an upper portion and a lower portion. The filter unit 812 may include a resonator substrate in the filter as a suspended air strip structure. According to an embodiment, the resonator substrate may be a plate on which a plurality of T-shaped resonators are formed. The filter unit 812 may include at least one of a band pass filter, a low pass filter, a high pass filter, or a band reject filter. That is, the filter unit 812 may include RF circuits for obtaining a signal of a frequency band for transmitting or a frequency band for receiving. According to various embodiments, the filter unit 812 may electrically connect the antenna unit 811 and the RF processing unit 813.

The RF processing unit 813 may include a plurality of RF paths. The RF path may be a unit of a path through which a signal received through an antenna or a signal radiated through an antenna passes. At least one RF path may be referred to as an RF chain. The RF chain may include a plurality of RF elements. The RF elements may include an amplifier, a mixer, an oscillator, a digital-to-analogue converter (DAC), an analogue-to-digital converter (ADC), etc. For example, the RF processing unit 813 may include an up-converter to up-convert a digital transmission signal of a base band into a transmission frequency, and a digital-to-analogue converter (DAC) to convert the up-converted digital transmission signal into an analogue RF transmission signal. The up-converter and the DAC may form a part of a transmission path. The transmission path may further include a power amplifier (PA) or a coupler (or a combiner). In addition, for example, the RF processing unit 813 may include an analogue-to-digital converter (ADC) to convert an analogue RF reception signal into a digital reception signal, and a down-converter to convert a digital reception signal into a digital reception signal of a base band. The ADC and the down-converter may form a part of a reception path. The reception path may further include a low noise amplifier (LNA) or a coupler (or a divider). RF components of the RF processing unit may be implemented on a PCB. The base station 810 may include a structure in which the antenna unit 811, the filter unit 812, the RF processing unit 813 are stacked in order of the units mentioned. The antennas and the RF components of the RF processing unit may be implemented on a PCB, and filters may be repeatedly coupled between the PCBs, thereby forming a plurality of layers.

The controller 814 may control overall operations of the electronic device 810. The controller 814 may include various modules for performing communication. The controller 814 may include at least one processor. According to an embodiment, the process may be a modem. The controller 814 may include modules for digital signal processing. For example, the controller 814 may include a modem. When transmitting data, the controller 814 generates complex symbols by encoding and modulating a transmission bit stream. In addition, for example, when receiving data, the controller 814 restores a reception bit stream by demodulating and decoding a baseband signal. The controller 814 may perform functions of a protocol stack required by communication standards.

FIG. 8 illustrates the functional configuration of the electronic device 810 as equipment for utilizing an antenna structure of the disclosure. Not only the filter 400 having the suspended structure shown in FIG. 4, but also the filter of the structure in which the additional strip is disposed, illustrated in FIGS. 6A to 7, may be used as a filter of the electronic device 810 of the disclosure. However, the example illustrated in FIG. 8 is merely an exemplary configuration for utilizing the antenna structure according to various embodiments of the disclosure, described through FIGS. 1A to 7, and embodiments of the disclosure are not limited to the components of the equipment illustrated in FIG. 8. Accordingly, an antenna module including an antenna structure, communication equipment of other configurations, and an antenna structure itself may be understood as an embodiment of the disclosure.

In the disclosure, a base station or an MMU for the base station has been described to explain an antenna filter and an electronic device including the same by way of an example, but various embodiments of the disclosure are not limited thereto. As an antenna filter and an electronic device including the same according to various embodiments of the disclosure, wireless equipment performing the same function as a base station, wireless equipment connected with a base station (for example, a TRP), the terminal 120, other communication equipment used for 5G communications may be used. In the disclosure, an antenna array formed of sub-arrays has been described as an example of a structure of a plurality of antennas for communication in a multiple input multiple output (MIMO) environment, but in some embodiments, changes may be easily made for beamforming.

In the disclosure, a tolerance refers to an acceptable limit of a standard range. The standard range may be determined according to an acceptable limit defined with reference to a nominal size, that is, a tolerance. An accumulated tolerance or tolerance accumulation may refer to an acceptable limit of an assembly according to accumulation of an acceptable limit of a single component when a plurality of components are assembled. An operational tolerance may refer to a tolerance that is defined according to component processing. In the case of a filter including a metal cavity resonator, a soldering structure may be applied for the sake of simplifying. However, it may be necessary to separately manage a tolerance due to an assembly tolerance of applied components such as resonators, tuning bolts for cross coupling, screws for fastening resonators during a manufacturing process. The tolerance may cause a cost to increase. A ceramic filter has an advantage in applying SMD and size, but has a problem that it is used only in limited communication equipment due to the lack of performance (for example, an S-parameter).

In order to solve the above-described problems, the filter having the suspended structure has been described in the disclosure through FIGS. 1A to 8. The plurality of resonators are arranged to form a layer in the filter within the same layer in order to achieve performance indicated by the S parameter. In addition, the size of the filter having the suspended structure of the disclosure is reduced, so that there are effects of connecting the filters to respective antennas of the antenna array and mass-producing the filters. It may be determined whether the disclosure is embodied, by identifying a plate in which a resonator is formed between a PCB, which is a filter board, and a cover of a filter product. In other words, it may be determined whether the disclosure is embodied, through existence of a resonance plate having a suspended structure. Additionally, it may be determined whether the disclosure is embodied by identifying serial arrangement of a plurality of resonators (for example, T-shaped resonators) on a resonance plate. This is because the serial arrangement may form a plurality of notches of S21 in a small size, and may provide a high skirt characteristic of a filter.

According to embodiments of the disclosure, a filter in a wireless communication system may include: a cover; a housing; a printed circuit board (PCB); and a resonance plate in which a plurality of resonators are formed on a single layer, and the resonance plate may be disposed between the cover and the PCB.

According to embodiments of the disclosure, each of the plurality of resonators may be a T-shaped resonance circuit.

According to embodiments of the disclosure, the plurality of resonators may be serially connected with one another.

According to embodiments of the disclosure, on the resonance plate, an area corresponding to the plurality of resonators may be occupied by a conductor, and an area other than the plurality of resonators may be empty.

According to embodiments of the disclosure, the PCB, the resonance plate, and the cover may be arranged to be stacked in sequence with reference to a specific direction, a first surface of the resonance plate and the cover may be arranged to form a first air gap based on the specific direction, and a second surface of the resonance plate and the PCB may be arranged to form a second air gap based on the specific direction.

According to embodiments of the disclosure, the resonance plate may include an input port and an output port, and an RF signal line connecting the input port and the output port, the input port may be coupled to one side of the housing, and the output port may be coupled to the other side of the housing.

According to embodiments of the disclosure, the RF signal line may be connected with the plurality of resonators.

According to embodiments of the disclosure, the output port may be connected to an antenna element of an antenna array.

According to embodiments of the disclosure, the housing may include a groove formed therein to accommodate the resonance plate.

According to embodiments of the disclosure, the PCB may include one or more engagement grooves for fastening to the housing.

According to embodiments of the disclosure, a structure in which the cover, the housing, and the resonance plate are coupled may be mounted on the PCB through surface mount technology (SMT).

According to embodiments of the disclosure, the plurality of resonators may include one or more inductive loads and one or more capacitive loads, and an inductance value of each of the one or more inductive loads and a capacitance value of each of the one or more capacitive loads may be configured to pass an RF signal of a specific frequency band.

According to embodiments of the disclosure, the inductance value of each of the one or more inductive loads and the capacitance value of each of the one or more capacitive loads may be configured to form a plurality of notches within a designated range from the specific frequency band.

According to embodiments of the disclosure, arrangements of the plurality of resonators may be related to a size of a cross coupling between nonadjacent resonators.

According to embodiments of the disclosure, a massive multiple input multiple output (MIMO) unit (MMU) device may include: at least one processor configured to process a signal; a plurality of filters configured to filter a signal; and an antenna array configured to radiate a signal, and the plurality of filters may include a filter configured by a resonance plate, which is arranged between an upper cover and the filter board, in which a plurality of resonators are formed on a single layer.

According to embodiments of the disclosure, each of the plurality of resonators may be a T-shaped resonance circuit.

According to embodiments of the disclosure, the plurality of resonators may be serially connected with one another.

According to embodiments of the disclosure, the resonance plate may be arranged to form a suspended air strip structure between the cover and the filter board, and on the resonance plate, an area corresponding to the plurality of resonators may be occupied by a conductor, and an area other than the plurality of resonators may be empty.

According to embodiments of the disclosure, the resonance plate may include an input port and an output port, and the output port may be connected to an antenna element of the antenna array.

According to embodiments of the disclosure, the filter may be mounted on the filter board through surface mount technology (SMT).

According to embodiments of the disclosure, a manufacturing method of a filter in a wireless communication system may include: generating a resonance plate in which a plurality of resonators are formed on a single layer; coupling the resonance plate with a housing, such that the housing having a predetermined height encloses the resonance plate within a specific range of the predetermined height; and performing surface mount technology (SMT) to mount a structure in which the resonance plate and the housing are coupled on the PCB.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

What is claimed is:

1. A filter in a wireless communication system, the filter comprising:

a cover;

a housing coupled with the cover, and including a first portion forming a side face of the filter and a second portion forming a bottom face of the filter, wherein the first portion of the housing includes a groove;

a resonance plate disposed in an inner space of the housing, and including an edge portion and a plurality of resonators, wherein the plurality of resonators include a first resonator, a second resonator, a third resonator, and a fourth resonator, and wherein the plurality of resonators are spaced apart from each other and connected with the edge portion;

a first conductive line connecting the first resonator with the second resonator; and a second conductive line connecting the first resonator with the third resonator, wherein the first resonator is disposed between the fourth resonator and the second resonator, wherein the second resonator is disposed between the first resonator and the third resonator, wherein the first resonator is capacitively connected with the fourth resonator without an inductive connection between the first resonator and the fourth resonator, wherein the second resonator is capacitively connected with the third resonator without an inductive connection between the second resonator and the third resonator, wherein the edge portion is electrically connected with a ground, and wherein the edge portion is inserted into the groove to be coupled with the housing.

2. The filter of claim 1, wherein the plurality of resonators are serially connected via at least one of a capacitive connection or an inductive connection, and wherein each of the plurality of resonators is a T-shaped resonance circuit.

3. The filter of claim 1, wherein the resonance plate comprises the edge portion, an opening portion, and a portion corresponding to the plurality of resonators including a conductor.

4. The filter of claim 1, wherein the second portion of the housing, the resonance plate, and the cover are stacked in sequence in a first direction, wherein a first air gap is formed between a first surface of the resonance plate and the cover, and wherein a second air gap is formed between a second surface of the resonance plate and the second portion.

5. The filter of claim 1, wherein the resonance plate comprises an input port and an output port, wherein the input port is coupled to a first side of the housing, and wherein the output port is coupled to a second side of the housing.

6. The filter of claim 5, wherein the output port is connected to an antenna element of an antenna array.

7. The filter of claim 1, wherein the plurality of resonators comprise at least one inductive load and at least one capacitive load, and wherein the filter is configured to pass a radio frequency (RF) signal of a specific frequency band based on an inductance value of each of the at least one inductive load and a capacitance value of each of the at least one capacitive load.

8. The filter of claim 7, wherein the inductance value of each of the at least one inductive load and the capacitance value of each of the at least one capacitive load are configured to form a plurality of notches within a designated range from the specific frequency band.

9. The filter of claim 8, wherein arrangements of the plurality of resonators are related to a size of a cross coupling between resonators which are not adjacent each other among the plurality of resonators.

10. The filter of claim 1, wherein the first resonator is inductively connected with the second resonator and the third resonator, and the second resonator is capacitively connected with the third resonator such that a notch for filtering a radio frequency (RF) signal of a specific frequency band is formed.

11. A massive multiple input multiple output (MIMO) unit (MMU) device comprising:

at least one processor configured to process a signal;

a plurality of filters configured to filter the signal; and an antenna array electrically connected to the plurality of filters and configured to radiate the signal, wherein a filter of the plurality of filters comprises:

a cover, a housing coupled with the cover, and including a first portion forming a side face of the filter and a second portion forming a bottom face of the filter, wherein the first portion of the housing includes a groove, a resonance plate disposed in an inner space of the housing, and including an edge portion and a plurality of resonators, wherein the plurality of resonators include a first resonator, a second resonator, a third resonator, and a fourth resonator, and wherein the plurality of resonators are spaced apart from each other and connected with the edge portion, a first conductive line connecting the first resonator with the second resonator, and a second conductive line connecting the first resonator with the third resonator, wherein the first resonator is disposed between the fourth resonator and the second resonator, wherein the second resonator is disposed between the first resonator and the third resonator, wherein the first resonator is capacitively connected with the fourth resonator without an inductive connection between the first resonator and the fourth resonator, wherein the second resonator is capacitively connected with the third resonator without an inductive connection between the second resonator and the third resonator, wherein the edge portion is electrically connected with a ground, and wherein the edge portion is inserted into the groove to be coupled with the housing.

12. The MMU device of claim 11, wherein the plurality of resonators are serially connected via at least one of a capacitive connection or an inductive connection, and wherein each of the plurality of resonators is a T-shaped resonance circuit.

13. The MMU device of claim 11, wherein the resonance plate comprises the edge portion, an opening portion, and a portion corresponding to the plurality of resonators including a conductor, and wherein the opening portion is a portion of the resonance plate other than the plurality of resonators.

14. The MMU device of claim 11, wherein the resonance plate includes an input port and an output port, and wherein the output port is connected to an antenna element of the antenna array.

15. The MMU device of claim 11, wherein the first resonator is inductively connected with the second resonator and the third resonator, and the second resonator is capacitively connected with the third resonator such that a notch for filtering a radio frequency (RF) signal of a specific frequency band is formed.

16. A method of manufacturing a filter in a wireless communication system, the method comprising:

providing a resonance plate including an edge portion and a plurality of resonators, wherein the plurality of resonators include a first resonator, a second resonator, a third resonator and a fourth resonator, and wherein the plurality of resonators are spaced apart from each other and connected with the edge portion; and coupling the resonance plate with a housing coupled with a cover, wherein the housing includes a first portion forming a side face of the filter and a second portion forming a bottom face of the filter, wherein the first portion of the housing includes a groove, wherein the first resonator and the second resonator are connected via a first conductive line, and the first resonator and the third resonator are connected via a second conductive line, wherein the first resonator is disposed between the fourth resonator and the second resonator, wherein the second resonator is disposed between the first resonator and the third resonator, wherein the first resonator is capacitively connected with the fourth resonator without an inductive connection between the first resonator and the fourth resonator, wherein the second resonator is capacitively connected with the third resonator without an inductive connection between the second resonator and the third resonator, wherein the edge portion is electrically connected with a ground, and wherein the edge portion is inserted into the groove to be coupled with the housing.

* * * * *